A. E. JONES.
MECHANISM FOR THE CONTROL OF THE PROPELLERS OF AUTOMOBILE TORPEDOES.
APPLICATION FILED MAR. 26, 1914. RENEWED JAN. 9, 1918.

1,256,502.

Patented Feb. 12, 1918.

WITNESSES

INVENTOR
ALBERT EDWARD JONES
BY
ATTORNEYS

UNITED STATES PATENT OFFICE.

ALBERT EDWARD JONES, OF FIUME, HUNGARY.

MECHANISM FOR THE CONTROL OF THE PROPELLERS OF AUTOMOBILE TORPEDOES.

1,256,502.  Specification of Letters Patent.  Patented Feb. 12, 1918.

Application filed March 26, 1914, Serial No. 827,352. Renewed January 9, 1918. Serial No. 211,104.

*To all whom it may concern:*

Be it known that I, ALBERT EDWARD JONES, a subject of the King of Great Britain, residing in Fiume, Hungary, 2 Via Volosca, engineer, have invented certain new and useful Improvements in and Relating to Mechanism for the Control of the Propellers of Automobile Torpedoes, of which the following is a complete specification.

This invention relates to mechanism for the control of the propellers of automobile torpedoes by means of turbines. The three conditions that mechanism of this type should fulfil are as follows:—

1. It should comprise or itself constitute a reduction mechanism for reducing the speed of rotation of the turbines to the desired extent suited to the propellers, 2. It should insure the rotation of the two propellers of the torpedoes in opposite directions, and 3. It should insure absolute mechanical dependence between the running of the two propellers.

Control mechanisms of the type in question fulfilling the conditions set forth above wholly or in part, have already been constructed, but all of them present the defect of comprising an excessive number of elements so that they are too bulky and moreover they are imperfectly balanced.

The invention has for its object control mechanism for the propellers of automobile torpedoes in which turbines satisfy the three conditions set forth by means of a minimum of elements with the minimum volume and moreover while perfectly balancing these elements.

Figure 1:
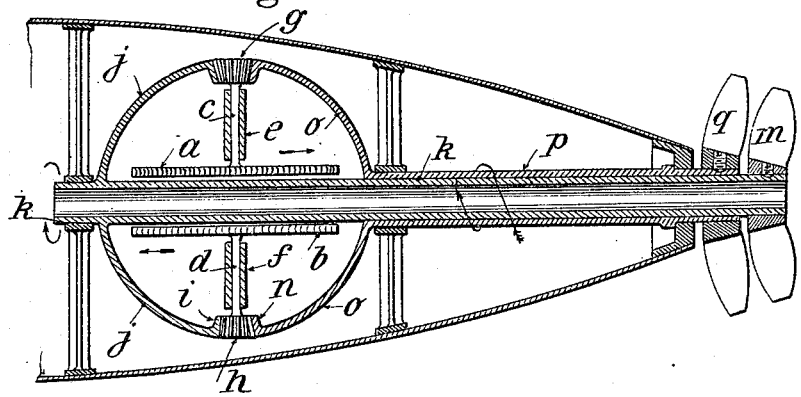
Figure 2:
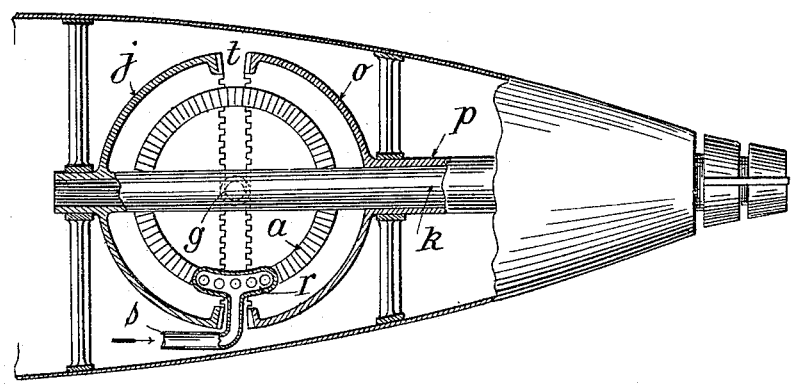

In the accompanying drawing:

Figure 1 is a horizontal longitudinal section of a portion of a torpedo showing the mechanism embodying the invention, in plan, Fig. 2 is a longitudinal section in a plane perpendicular to that of Fig. 1.

The two turbine wheels $a$ and $b$ rotate in opposite directions and they are arranged parallel to each other in two planes parallel to the longitudinal axis of the torpedo. The shafts $c$ and $d$ of the turbines, carried respectively in appropriate bearings $e$ and $f$, end respectively in the bevel pinions $g$ and $h$. These two pinions, which rotate in opposite directions, are in mesh on one side of the shafts $c$ and $d$ of the turbines with a gear wheel $j$, having a hemispherical body, rigidly connected with the hollow shaft $k$ of the propeller $m$ of the torpedo. On the other side of the shafts $c$ and $d$ of the turbines these same bevel pinions also mesh with a gear wheel with hemispherical body $o$ rigidly connected with the hollow shaft $p$ of the other propeller $q$. The two gears $j$ and $o$ are separated by an annular gap $t$ and form a cover for the turbine wheels $a$ and $b$. Fig. 2 shows the arrangement of the injection nozzles $r$ of the turbines, the pipe $s$ supplying the motor fluid to this nozzle passing through the annular space $t$.

The operation of the device is self-evident, and it will be noted that the three conditions enumerated above are fulfilled, that is to say:

1. The device itself constitutes a gearing down mechanism and in particular it should be noted that the great difference of diameter between the pinions $g$ and $h$ and the gear wheels $j$ and $o$ gives the desired gearing down, with these four elements only, without any intermediate gear wheels or train of gear wheels.

2. The two propellers $q$ and $m$ rotate in opposite directions as do the turbine wheels $a$ and $b$.

3. Owing to the two gear wheels $j$ and $o$ meshing with the two bevel pinions $g$ and $h$ directly driven by the turbines, an invariable mechanical connection and absolute mechanical dependence exist between the rotation of the two propellers $q$ and $m$. Finally, 4. The two pinions $g$ and $h$ and the two gear wheels $j$ and $o$ act in the same manner at two diametrically opposite points, so that the efforts acting upon them or the forces that they transmit are perfectly balanced.

The invention therefore permits of obtaining with four elements only, that is to say the two pinions $g$ and $h$ and the two gear wheels $j$ and $o$, a driving mechanism for the propellers by the turbines which fulfils all the conditions required in the application to torpedoes.

From the constructional point of view, it should be noted that the device is particularly characterized by its small volume which is also a necessary condition for its application to torpedoes in which the available space is very limited.

What I claim is:

1. In an automobile torpedo, concentric propeller shafts, turbines on opposite sides of the shafts, and having their shafts at right angles to the said concentric shafts, and gearing between the turbine shafts and the concentric shafts.

2. A constructional form of automobile torpedo of the kind set forth in which two turbine wheels are located in planes parallel with the longitudinal axis of the torpedo and mounted on a pair of shafts at the extremities of which bevel pinions are arranged, which latter mesh on one side of the said shafts with the toothed ring of a gear wheel in the form of a hemispherical body rigidly connected with the hollow shaft of one of the propellers, and on the other side of the turbine shafts with another toothed ring of a gear wheel in the form of a hemispherical body rigidly connected to the hollow shaft of the other propeller.

3. In an automobile torpedo, concentric propeller shafts, a gear wheel on each shaft, oppositely rotatable turbines on opposite sides of the said shafts, and pinions on the shafts of the turbines and meshing with the said gear wheels.

4. In an automobile torpedo, a driving mechanism comprising a pair of concentric shafts, facing gear wheels on one end of each shaft, a propeller on the other end of each shaft, diametrically opposite pinions meshing with each of said gears, and oppositely rotatable turbine wheels on opposite sides of the said shafts on the shafts of which the pinions are mounted.

5. In an automobile torpedo, a driving mechanism comprising a pair of concentric shafts, a propeller carried by each of said shafts, facing gear wheels one for each of said shafts, diametrically opposite pinions in mesh with the facing gear wheels, and oppositely rotatable turbine wheels on the shafts of which the said pinions are mounted, said facing gears inclosing said turbines therebetween.

6. In an automobile torpedo, a driving mechanism comprising a pair of concentric shafts, propellers associated with said shafts, each of said shafts having a semispherical portion, said portions facing each other and spaced from one another by an annular gap, the said semispherical portions being toothed in the part forming the gap, a pair of pinions in said gap meshing with the teeth of both semispherical portions, a turbine wheel for each of said pinions within said semispherical portions, said turbines being adapted to rotate in opposite directions, the axes of said turbines and pinions being in alinement and perpendicular to the axes of said concentric shafts.

7. In an automobile torpedo, a propelling mechanism, comprising a pair of concentric shafts, propellers associated with said shafts, a turbine wheel on each side of said shafts and parallel with the axes thereof, said turbines being adapted to rotate in opposite directions, a gear wheel associated with each of said shafts, said gear wheels facing each other and forming a spherical casing having an annular gap, a pinion associated with each of said turbine wheels and meshing with each of said gears, said pinions being diametrically opposite, and said casing formed by the gears inclosing said turbines and pinions.

In testimony whereof I have hereunto placed my hand at Fiume, Hungary, this seventh day of March, 1914.

ALBERT EDWARD JONES.

In the presence of two witnesses:
W. A. BERGMANN,
GASTON VAN RONDIO RADIIS.

Copies of this patent may be obtained for five cents each, by addressing the "Commissioner of Patents, Washington, D. C."